US012771286B2

(12) United States Patent
Peng et al.

(10) Patent No.: US 12,771,286 B2
(45) Date of Patent: Oct. 20, 2026

(54) FLEXIBLE PHOTOVOLTAIC TRACKING BRACKET WITH IMPROVED STABLE STRUCTURE

(71) Applicant: ARCTECH SOLAR HOLDING CO., LTD., Kunshan City (CN)

(72) Inventors: Yinghai Peng, Kunshan City (CN); Haijun Liu, Kunshan City (CN); Ying Yang, Kunshan City (CN)

(73) Assignee: ARCTECH SOLAR HOLDING CO., LTD., Kunshan City (CN)

( * ) Notice: Subject to any disclaimer, the term of this patent is extended or adjusted under 35 U.S.C. 154(b) by 0 days.

(21) Appl. No.: 18/942,766

(22) Filed: Nov. 10, 2024

(65) Prior Publication Data

US 2025/0309817 A1 Oct. 2, 2025

Related U.S. Application Data

(63) Continuation-in-part of application No. PCT/CN2024/106904, filed on Jul. 23, 2024.

(30) Foreign Application Priority Data

Mar. 29, 2024 (CN) ......................... 202410371079.2

(51) Int. Cl.
*H02S 20/32* (2014.01)
*H02S 30/10* (2014.01)

(52) U.S. Cl.
CPC ............. *H02S 20/32* (2014.12); *H02S 30/10* (2014.12)

(58) Field of Classification Search
CPC ................................ H02S 20/32; H02S 30/10
See application file for complete search history.

(56) References Cited

U.S. PATENT DOCUMENTS

2022/0149774 A1 5/2022 Palmer et al.
2023/0006602 A1 1/2023 Butcher

FOREIGN PATENT DOCUMENTS

CL 202500700 U1 10/2025
CN 107238221 A 10/2017
CN 107370449 A 11/2017
CN 113445668 * 9/2021
CN 113445668 A 9/2021
CN 113678368 A 11/2021

(Continued)

*Primary Examiner* — Jayne L Mershon
(74) *Attorney, Agent, or Firm* — Cheng-Ju Chiang

(57) ABSTRACT

A flexible photovoltaic tracking bracket includes a number of basic structures, a number of beam structures, a driving device, a rope structure connecting adjacent beam structures, and a support frame. The rope structure includes assembly ropes and stabilizing ropes. The stabilizing ropes are located below the assembly ropes. The assembly ropes are configured to be fixedly connected to a photovoltaic module. The assembly ropes include a first assembly rope and a second assembly rope which are disposed along a left-right direction. The stabilizing ropes include a first stabilizing rope and a second stabilizing rope which are disposed along the left-right direction. The support frame is connected to the assembly ropes and the stabilizing ropes. The first stabilizing rope is in an arc shape that curves in an upper right direction, and/or, the second stabilizing rope is in an arc shape that curves in an upper left direction.

18 Claims, 13 Drawing Sheets

(56) References Cited

FOREIGN PATENT DOCUMENTS

| | | | | |
|---|---|---|---|---|
| CN | 215646660 | U | | 1/2022 |
| CN | 215817990 | | * | 2/2022 |
| CN | 216490302 | U | | 5/2022 |
| CN | 216490303 | U | | 5/2022 |
| CN | 114785245 | A | | 7/2022 |
| CN | 114865995 | | * | 8/2022 |
| CN | 114865995 | A | | 8/2022 |
| CN | 218499043 | U | | 2/2023 |
| CN | 115913078 | A | | 4/2023 |
| CN | 218829784 | U | | 4/2023 |
| CN | 218850695 | U | | 4/2023 |
| CN | 218940985 | U | | 4/2023 |
| CN | 116054690 | A | | 5/2023 |
| CN | 116722809 | | * | 9/2023 |
| CN | 116722809 | A | | 9/2023 |
| CN | 116760337 | A | | 9/2023 |
| CN | 116760343 | A | | 9/2023 |
| CN | 220553953 | U | | 3/2024 |
| CN | 118249717 | A | | 6/2024 |
| CN | 221380852 | U | | 7/2024 |
| CN | 221380853 | U | | 7/2024 |
| EA | 201600648 | A1 | | 3/2018 |
| KR | 10-2019-0050044 | A | | 5/2019 |
| WO | 2023/000712 | A1 | | 1/2023 |
| WO | 2025/200199 | A1 | | 10/2025 |

* cited by examiner

FLEXIBLE PHOTOVOLTAIC TRACKING BRACKET WITH IMPROVED STABLE STRUCTURE

CROSS-REFERENCE TO RELATED APPLICATIONS

The present disclosure is a bypass continuation-in-part of National Phase conversion of International (PCT) Patent Application No. PCT/CN2024/106904, filed on Jul. 23, 2024, which further claims priority of a Chinese Patent Application No. 202410371079.2, filed on Mar. 29, 2024 and titled "FLEXIBLE PHOTOVOLTAIC TRACKING BRACKET", the entire content of which is incorporated herein by reference.

TECHNICAL FIELD

The present disclosure relates to the technical field of flexible photovoltaic brackets, in particular to a flexible photovoltaic tracking bracket.

BACKGROUND

The mainstream flexible photovoltaic tracking brackets in the market usually use a three-rope system with triangular support. When the assembly rotates to a larger inclination angle, the center of gravity of the entire system deviates from the center of rotation, generating torque. After running for a period of time, the installation plane of the assembly will be twisted and deformed, which not only affects the stability, but also affects the power generation of the assembly and affects the aesthetics. In addition, it will also cause the motor current of the rotary driving mechanism to increase, which can easily cause motor overcurrent and increase the cost of use.

Therefore, it is desirable to provide a new flexible photovoltaic tracking bracket to solve the above problems.

SUMMARY

An object of the present disclosure is to provide a flexible photovoltaic tracking bracket in which a photovoltaic module is not easily twisted, thereby effectively improving the structural stability and ensuring the power generation.

In order to achieve the above object, the present disclosure adopts the following technical solution:

a flexible photovoltaic tracking bracket, including:

a plurality of basic structures fixed to a ground at intervals;

a plurality of beam structures installed to the base structures;

a driving device installed to the beam structure and configured to drive the beam structure to rotate around an axis;

a rope structure connecting adjacent beam structures; the rope structure including assembly ropes and stabilizing ropes; the stabilizing ropes being located below the assembly ropes; the assembly ropes being configured to be fixedly connected to a photovoltaic module; the assembly ropes including a first assembly rope and a second assembly rope which are disposed along a left-right direction; the stabilizing ropes including a first stabilizing rope and a second stabilizing rope which are disposed along the left-right direction; and a support frame connected to the assembly ropes and the stabilizing ropes;

wherein the first stabilizing rope is in an arc shape that curves in an upper right direction, and/or, the second stabilizing rope is in an arc shape that curves in an upper left direction.

The present disclosure also adopts the following technical solution:

a flexible photovoltaic tracking bracket, including:

a plurality of basic structures configured to be fixed to a ground and being disposed at intervals;

a plurality of beam structures correspondingly installed to the base structures;

a driving device configured to drive each beam structure to rotate around an axis;

a rope structure connecting adjacent beam structures; the rope structure including assembly ropes and stabilizing ropes; the stabilizing ropes being located below the assembly ropes; the assembly ropes being configured to be fixedly connected to a photovoltaic module; the assembly ropes including a first assembly rope and a second assembly rope which are disposed along a left-right direction; the stabilizing ropes including a first stabilizing rope and a second stabilizing rope which are disposed along the left-right direction; and a support frame being of a quadrilateral configuration, the support frame including a first cross rod, a second cross rod disposed opposite to the first cross rod, a first side rod and a second side rod disposed opposite to the first side rod; the first cross rod connecting the first assembly rope and the second assembly rope; the second cross rod connecting the first stabilizing rope and the second stabilizing rope; the first assembly rope being connected to one end the first cross rod, and the second assembly rope being connected to another end of the first cross rod; the first stabilizing rope being connected to one end of the second cross rod, and the second stabilizing rope being connected to another end of the second cross rod;

wherein the first stabilizing rope is in an arc shape that curves in an upper right direction, and/or, the second stabilizing rope is in an arc shape that curves in an upper left direction.

Compared with the existing technology, the beneficial effects of the flexible photovoltaic tracking bracket of the present disclosure are as follows.

The present disclosure adopts a four-rope structure, and is provided with the assembly ropes for supporting a photovoltaic module and the stabilizing ropes located below the assembly ropes. The stabilizing ropes include the first stabilizing rope and the second stabilizing rope which are disposed along the left-right direction. The first stabilizing rope has an arc shape that curves in the upper right direction, and/or the second stabilizing rope has an arc shape that curves in the upper left direction. When the assembly ropes rotate under the drive of the driving device, the pre-stressed force of the bottommost stabilizing rope (such as the first stabilizing rope) can generate a supporting force to the upper left or the upper right. A moment formed by the supporting force around a center of rotation of the photovoltaic module can overcome a moment formed by a center of gravity of the entire system not being at the center of rotation, thereby ensuring the stability of the entire row of photovoltaic modules. As a result, all the photovoltaic modules installed on the assembly ropes are on the same plane and are not easily twisted, which ensures the power generation and also overcomes the self-weight of the photovoltaic modules to make the outer edges of all photovoltaic modules flush and beautiful in appearance.

Another stabilizing rope (such as the second stabilizing rope) can generate resistance to the force exerted on the front of the photovoltaic module by wind and support the photovoltaic module upward to overcome its gravity, thereby improving wind resistance.

The present disclosure can also improve the smoothness of the rotation of the entire rope structure, reduce the stress on the inclinable beam, save materials for the inclinable beam, and reduce costs. Besides, the present disclosure can also reduce the current of the motor and ensure the service life of the motor.

DETAILED DESCRIPTION

Exemplary embodiments of the present disclosure will be described in detail below with reference to the accompanying drawings. If there are several specific embodiments, features of these embodiments may be combined with each other provided there is no conflict. When the description refers to the drawings, the same numbers in different drawings refer to the same or similar elements, unless otherwise stated. The following description of exemplary embodiments does not represent all embodiments consistent with the present disclosure. Rather, they are merely examples of devices, products and/or methods consistent with aspects of the present disclosure as recited in the claims of the present disclosure.

The terminologies used in the present disclosure are only for the purpose of describing specific embodiments, and are not intended to limit the protection scope of the present disclosure. The singular forms “a”, “said”, and “the” used in the specification and claims of the present disclosure are also intended to include plural forms unless the context clearly indicates other meanings.

It should be understood that the terms “first”, “second” and similar words used in the specification and claims of the present disclosure do not represent any order, quantity or importance, but are only used to distinguish different components. Similarly, “an” or “a” and other similar words do not mean a quantity limit, but mean that there is at least one. Unless otherwise noted, “front”, “rear”, “top”, “bottom” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Referring to FIG. 1 to FIG. 15, this embodiment discloses a flexible photovoltaic tracking bracket which includes a plurality of base structures, a plurality of beam structures, a plurality of driving devices, a plurality of rope structures and a plurality of support frames 20. The plurality of basic structures are fixed to a ground at intervals. Each basic structure is equipped with one beam structure and one driving device. The driving device is installed to the beam structure. The rope structure connects adjacent beam structures. A plurality of photovoltaic modules 100 are mounted on the rope structure. The driving device is used to drive an inclinable beam of the beam structure to rotate around an axis, thereby driving the rope structure and the photovoltaic modules 100 to rotate synchronously.

Figure 1:
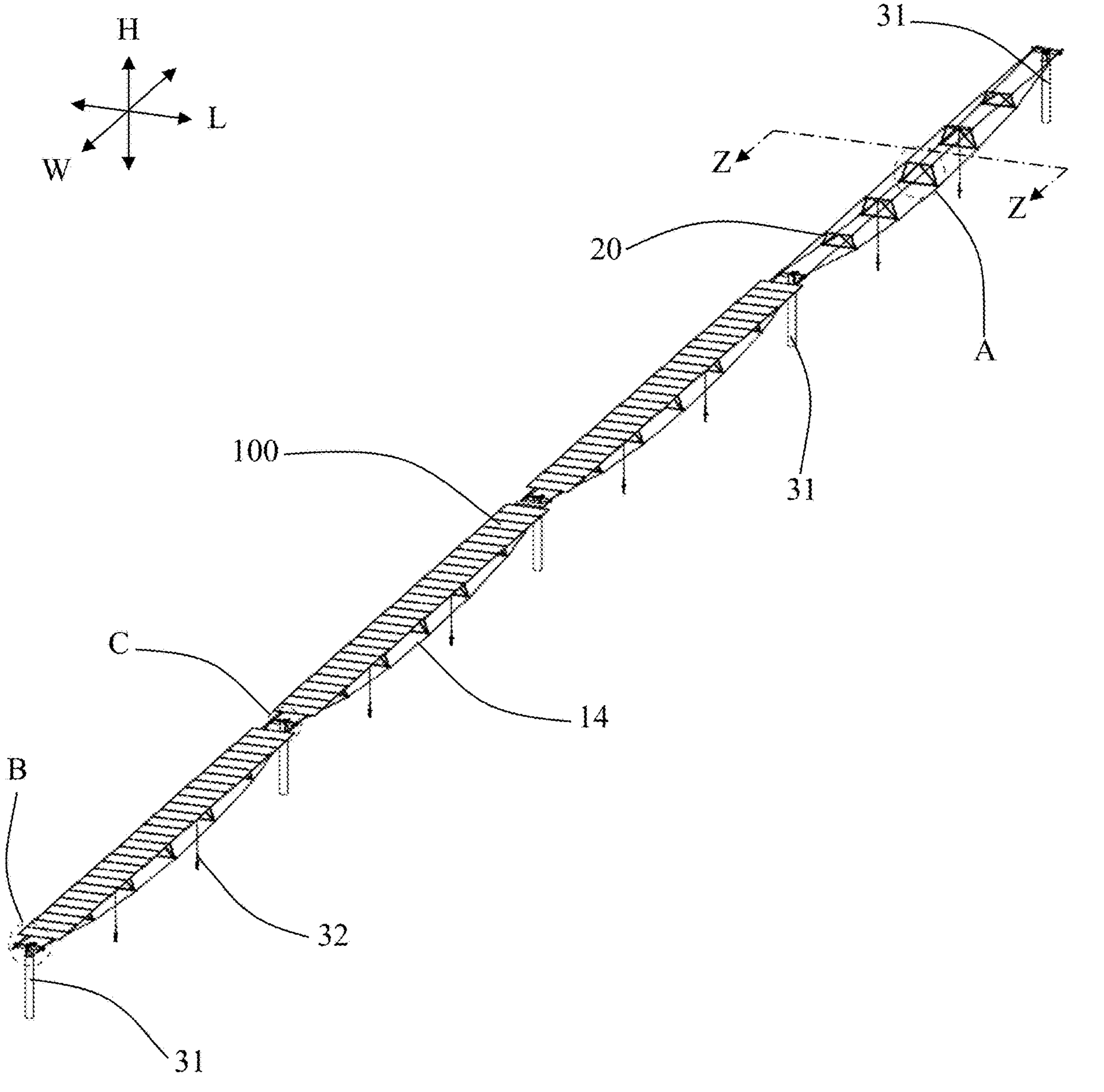
FIG. 1 is a schematic structural view of a flexible photovoltaic tracking bracket in accordance with a specific embodiment of the present disclosure.
Figure 2:
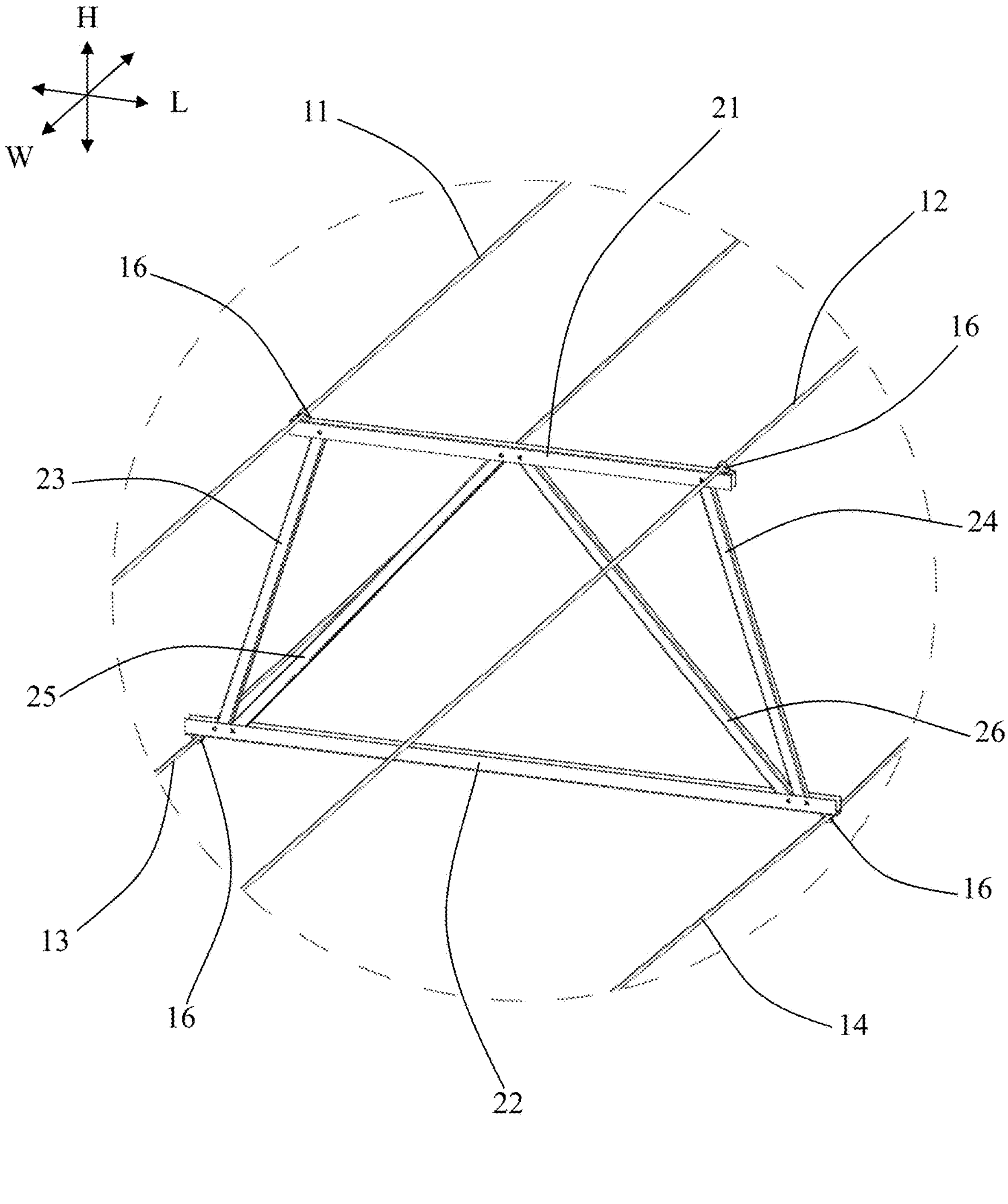
FIG. 2 is an enlarged structural view of area A in FIG. 1.

To facilitate the description of the embodiment of the present disclosure, referring to FIG. 1, a length direction of the photovoltaic modules 100, that is, a left-right direction or a transverse direction of the rope structure, is marked as L. A width direction of the photovoltaic modules 100, that is, a longitudinal direction or an extension direction of the rope structure, is marked as W. A thickness direction of the photovoltaic modules 100, that is, a top-bottom direction of the rope structure, is marked as H. The three directions in FIG. 1 are perpendicular to one another.

Figure 5:
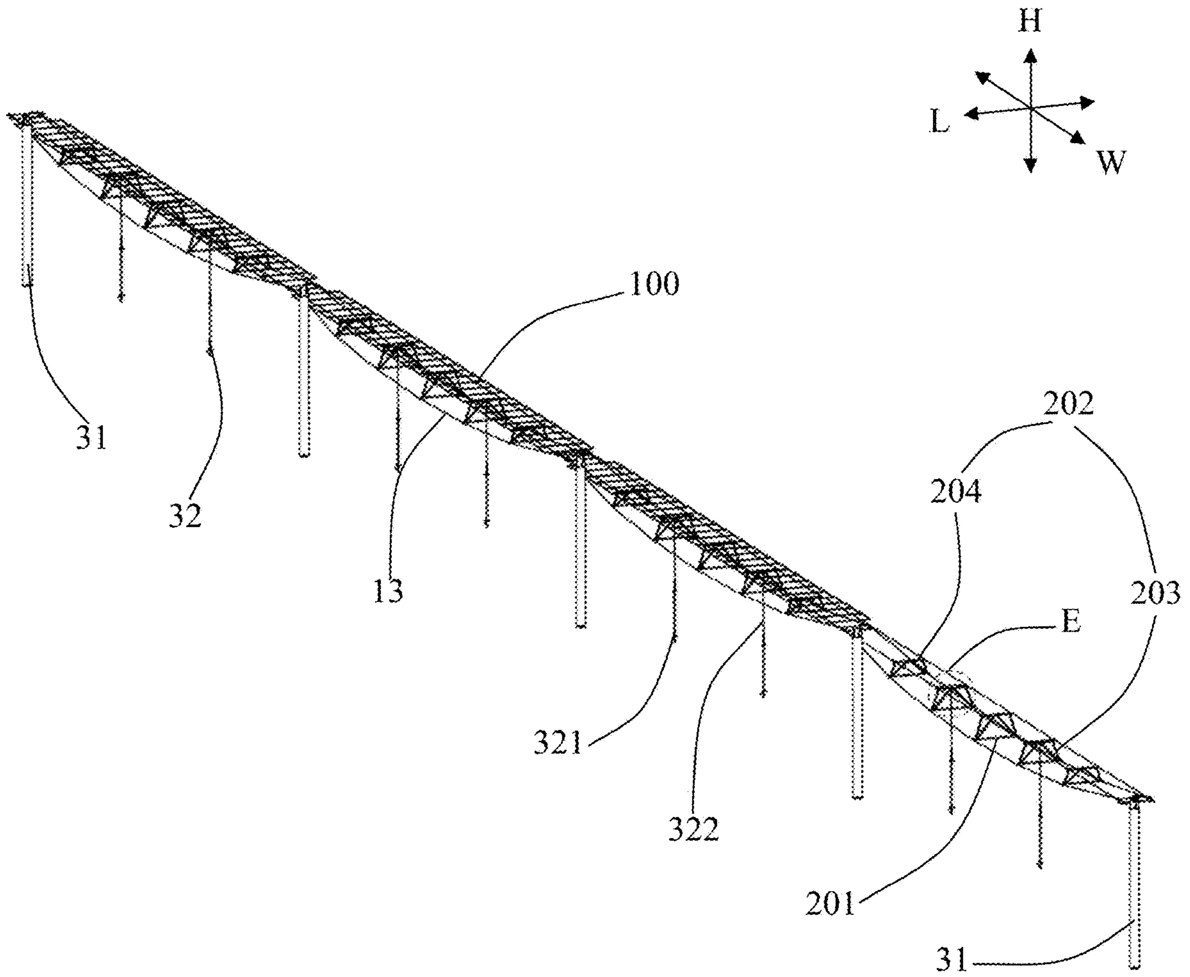
FIG. 5 is a schematic structural view of the flexible photovoltaic tracking bracket in accordance with the specific embodiment of the present disclosure.
Figure 6:
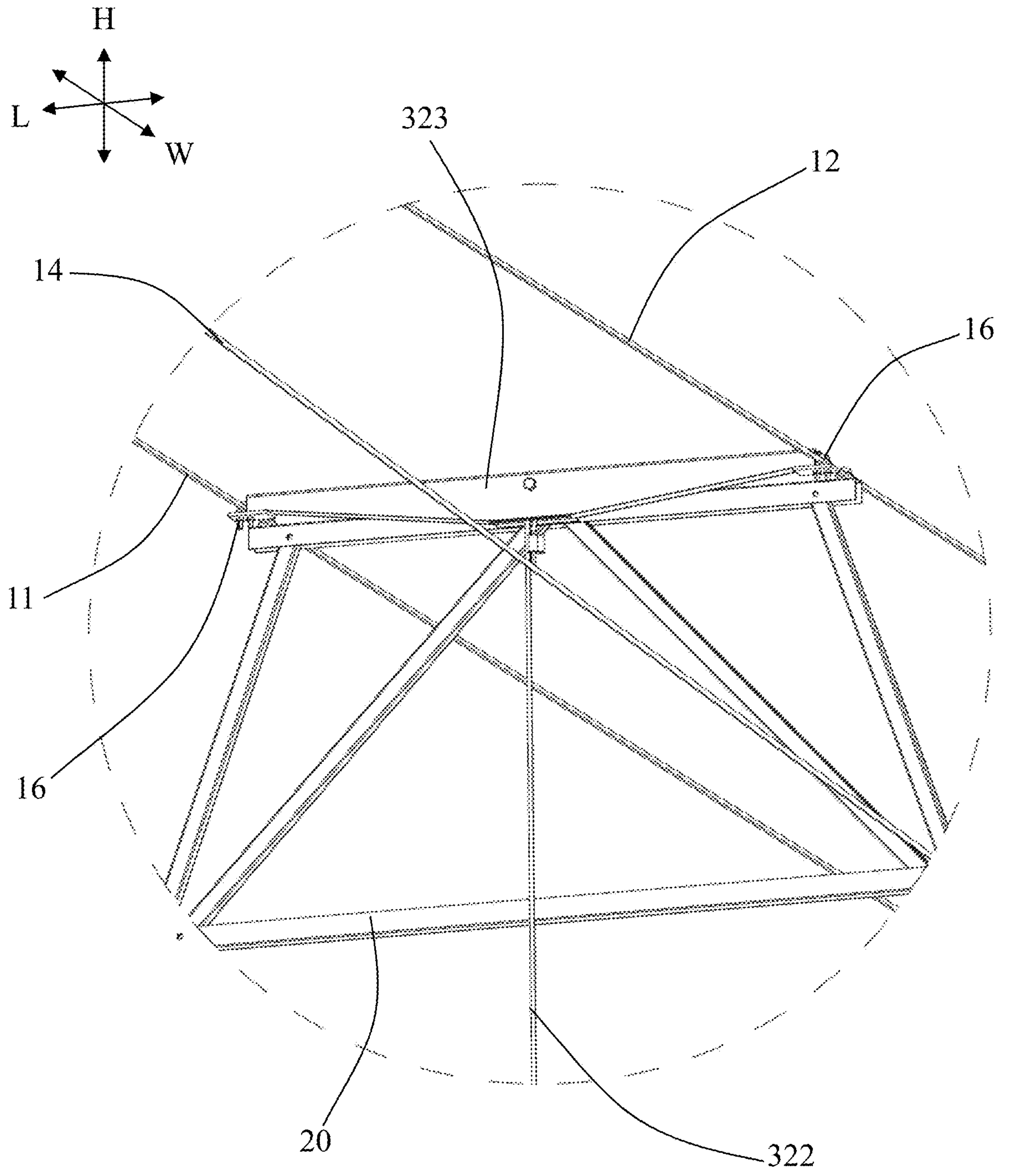
FIG. 6 is an enlarged structural schematic view of area E in FIG. 5.
Figure 7:
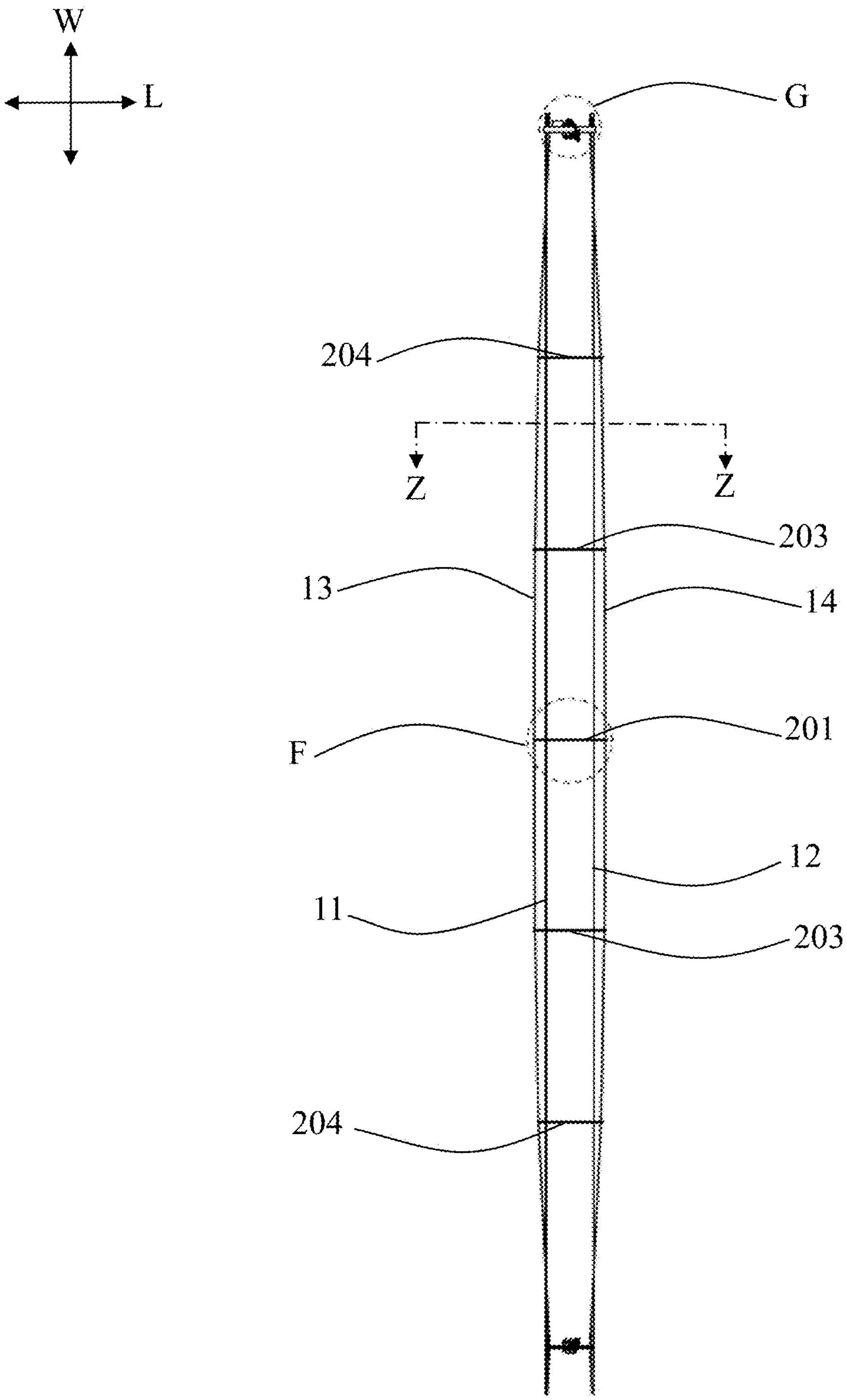
FIG. 7 is a schematic top view of a rope structure in accordance with a specific embodiment of the present disclosure.

Referring to FIG. 1, FIG. 2, FIG. 5, FIG. 7 and FIG. 8, the rope structure includes assembly ropes and stabilizing ropes which are located below the assembly ropes. The stabilizing ropes here are underneath the relative assembly ropes. When the flexible photovoltaic tracking bracket is located on a slope or a mountain, the stabilizing ropes are located obliquely below the assembly ropes, which is also within the protection scope of the technical solution. The assembly ropes are configured to be fixedly connected to the photovoltaic modules 100. Furthermore, in this embodiment, at least two assembly ropes and at least two stabilizing ropes are provided respectively. The assembly ropes include a first assembly rope 11 and a second assembly rope 12 which are disposed in the left-right direction (the L direction). The stabilizing ropes include a first stabilizing rope 13 and a second stabilizing rope 14 which are disposed in the left-right direction (the L direction). The first assembly rope 11 and the second assembly rope 12 are arranged in parallel. The support frames 20 are installed inside the rope structure, and the support frames 20 connect the first assembly rope 11, the second assembly rope 12, the first stabilizing rope 13 and the second stabilizing rope 14. The first stabilizing rope 13 has an arc shape that curves in an upper right direction; and/or, the second stabilizing rope 14 has an arc shape that curves in an upper left direction. That is, in the length direction (the L direction) of the photovoltaic modules 100, both the first stabilizing rope 13 and the second stabilizing rope 14 have an arc shape that is bent toward an outside of the assembly ropes, as shown in FIG. 7. In the thickness direction (the H direction) of the photovoltaic modules 100, the first stabilizing rope 13 and the second stabilizing rope 14 both have a curved arc shape with two ends bent upwardly, as shown in FIG. 1 and FIG. 5. The specific arc size and radius of curvature are adjustable according to the on-site environmental conditions and bearing capacity needs of the project site.

With this arrangement, when the assembly ropes rotate driven by the driving device, the pre-stressed force of the bottommost stabilizing rope (such as the first stabilizing rope 13) can generate an upward supporting force. A moment formed by the supporting force around a center of gravity of the photovoltaic modules 100 can overcome or offset a moment formed by the center of gravity of the photovoltaic modules 100 not being at a center of rotation. If this moment is not overcome, the photovoltaic modules 100 will be twisted after being used for a period of time, causing the photovoltaic modules 100 in a middle position and a position adjacent to the basic structure to be out of the same plane, affecting the power generation. The technical solution of the present disclosure can ensure that all the photovoltaic modules 100 are kept on a same plane. The stabilizing rope on another side (such as the second stabilizing rope 14) can generate resistance to the force exerted on the front of the module by wind and support the photovoltaic modules 100 upward to overcome its gravity, thereby improving the wind resistance.

Here, the first stabilizing rope 13 having an arc shape that curves in the upper right direction, and the second stabilizing rope 14 having an arc shape that curves in the upper left direction, are based on a fact that the first stabilizing rope 13 is disposed on a left side, and the second stabilizing rope 14 is disposed on a right side. If the left and right positions of the first stabilizing rope 13 and the second stabilizing rope 14 are simply changed, that is, the first stabilizing rope 13 is disposed on the right side, and the second stabilizing rope 14 is disposed on the left side, then the first stabilizing rope 13 has an arc shape that curves in the upper left direction, and the second stabilizing rope 14 has an arc shape that curves in the upper right direction. These two scenarios should be regarded as equivalent technical features or technical solutions.

Figure 8:
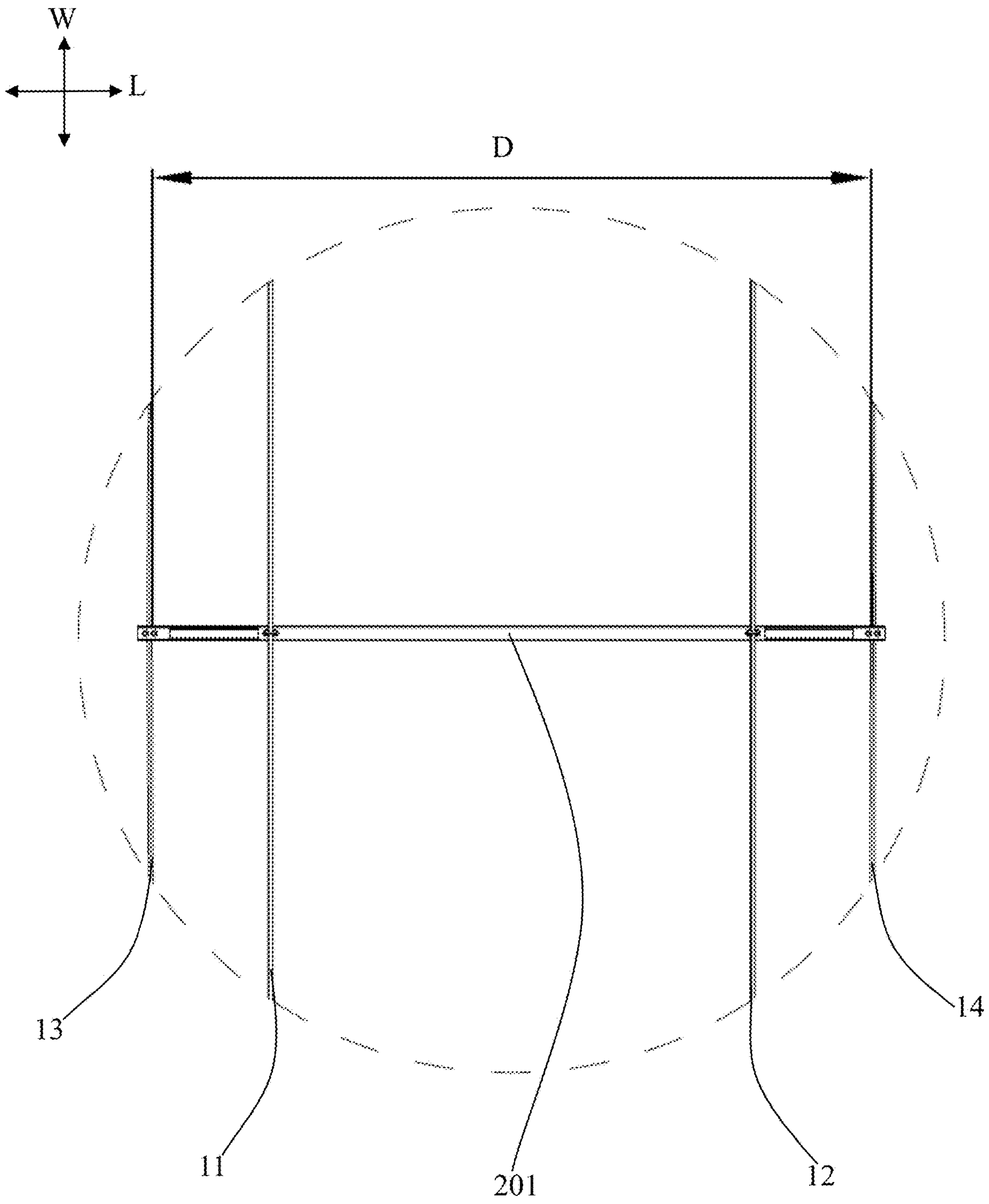
FIG. 8 is an enlarged structural view of area F in FIG. 7.

In this embodiment, when viewed in a direction perpendicular to a plane where the first assembly rope 11 and the second assembly rope 12 are located, the assembly ropes are located between the first stabilizing rope 13 and the second stabilizing rope 14, as shown in FIG. 7. Such an arrangement can ensure that the rope structure maintains good stability within a large rotation range, making the entire row of photovoltaic modules 100 less likely to be twisted and ensuring the power generation. In addition, due to the relatively long distance between the stabilizing ropes and the assembly ropes, the anti-torsional performance of the entire rope structure can also be improved. Here, the assembly ropes being located between the first stabilizing rope 13 and the second stabilizing rope 14 means that two assembly ropes are completely located between the first stabilizing rope 13 and the second stabilizing rope 14 laterally, or that the two assembly ropes are located between a maximum lateral distance D between the first stabilizing rope 13 and the second stabilizing rope 14, as shown in FIG. 8.

In another embodiment, as viewed along the direction perpendicular to the plane where the first assembly rope 11 and the second assembly rope 12 are located, the first stabilizing rope 13 and the second stabilizing rope 14 are located between two assembly ropes (i.e., the first assembly rope 11 and the second assembly rope 12).

In this embodiment, based on a cross-section of the rope structure, that is, the cross-section along the Z-Z line in FIG. 1 and FIG. 7, the first stabilizing rope 13 and the second stabilizing rope 14 are symmetrical with respect to a mid-perpendicular line perpendicular to a connecting line connecting the first assembly rope 11 and the second assembly rope 12, so that the force of the flexible photovoltaic tracking bracket rotating in the east-west direction (the L direction) is balanced.

Figure 3:
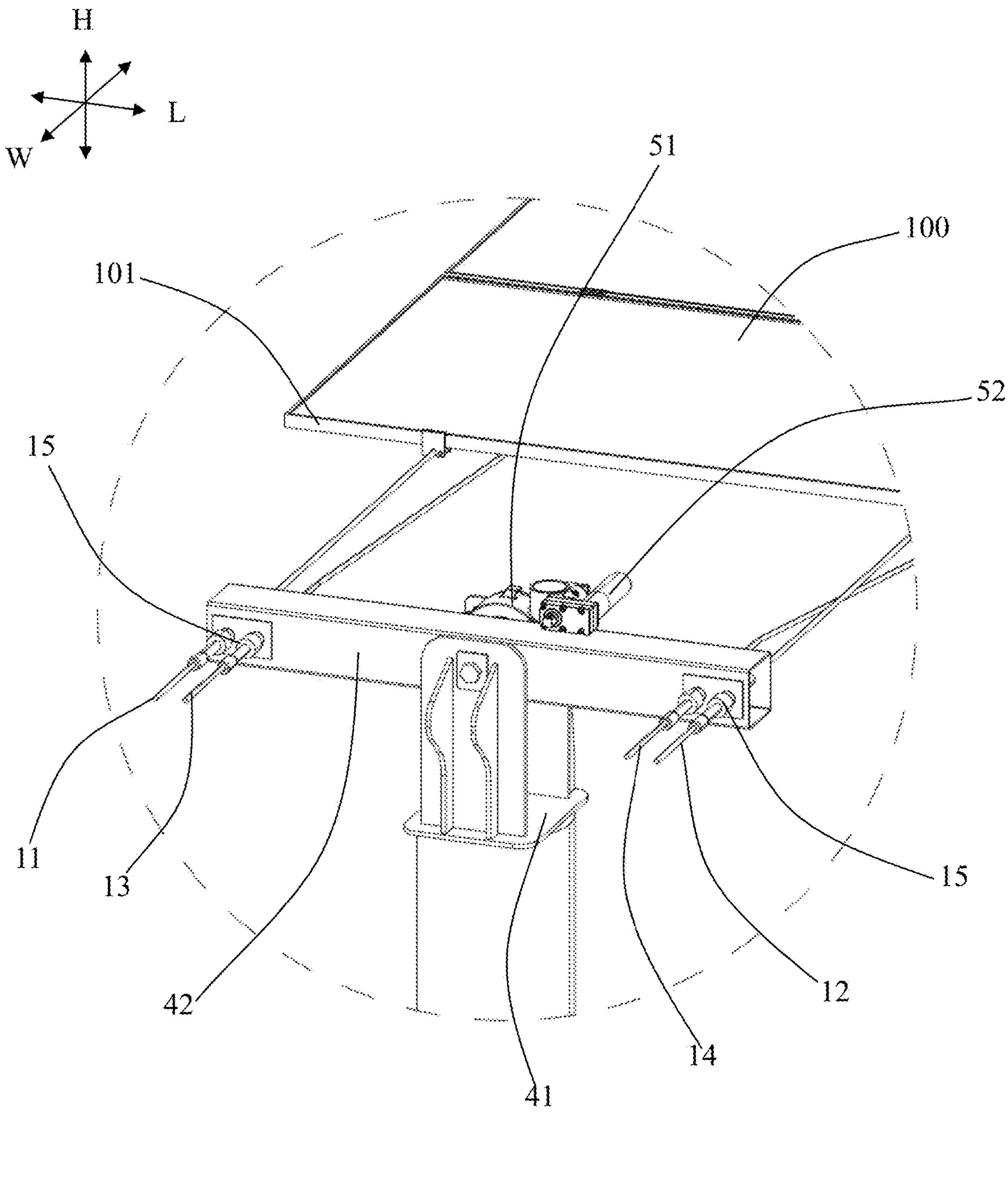
FIG. 3 is an enlarged structural view of area B in FIG. 1.
Figure 4:
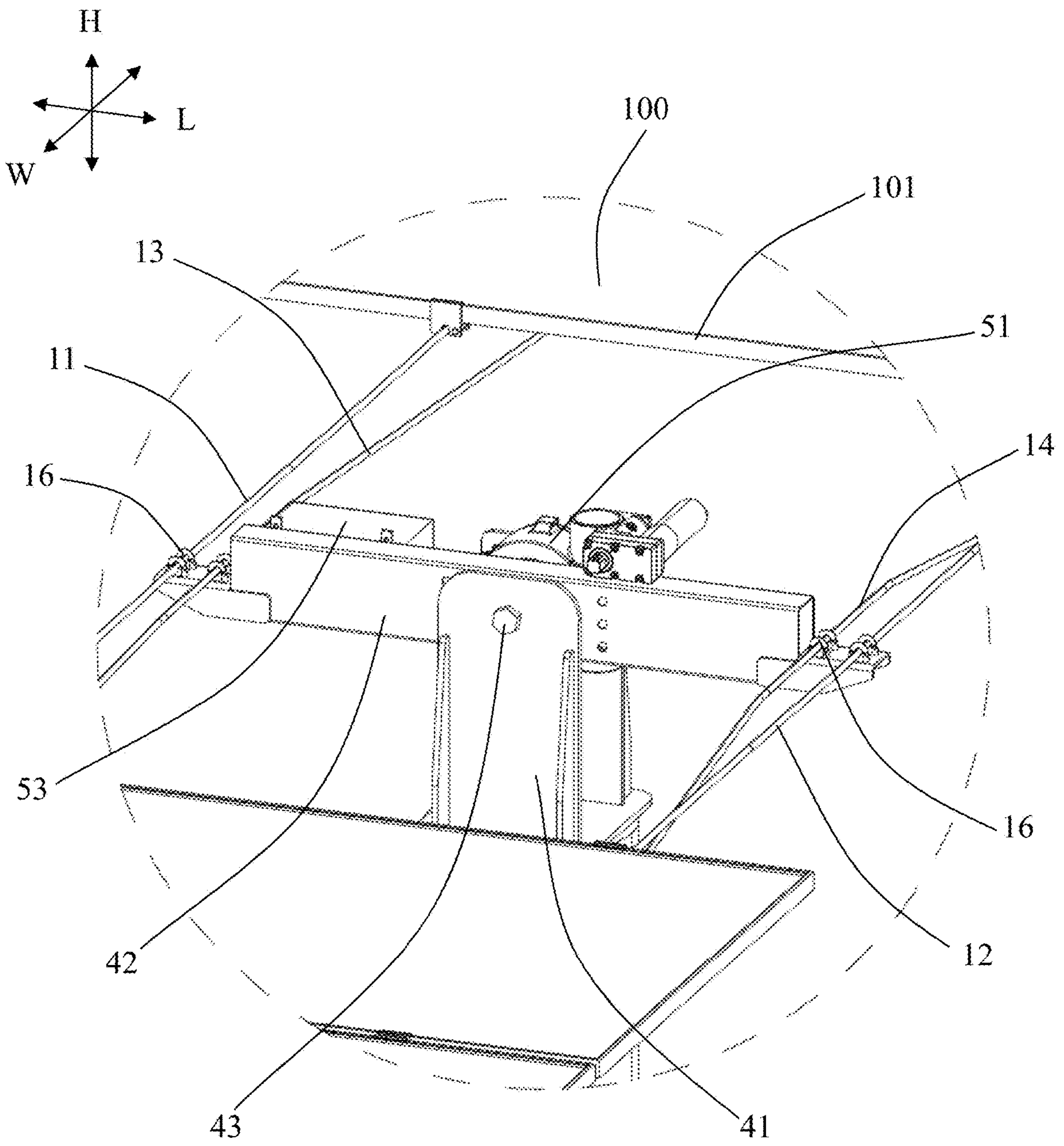
FIG. 4 is an enlarged structural view of area C in FIG. 1.
Figure 9:
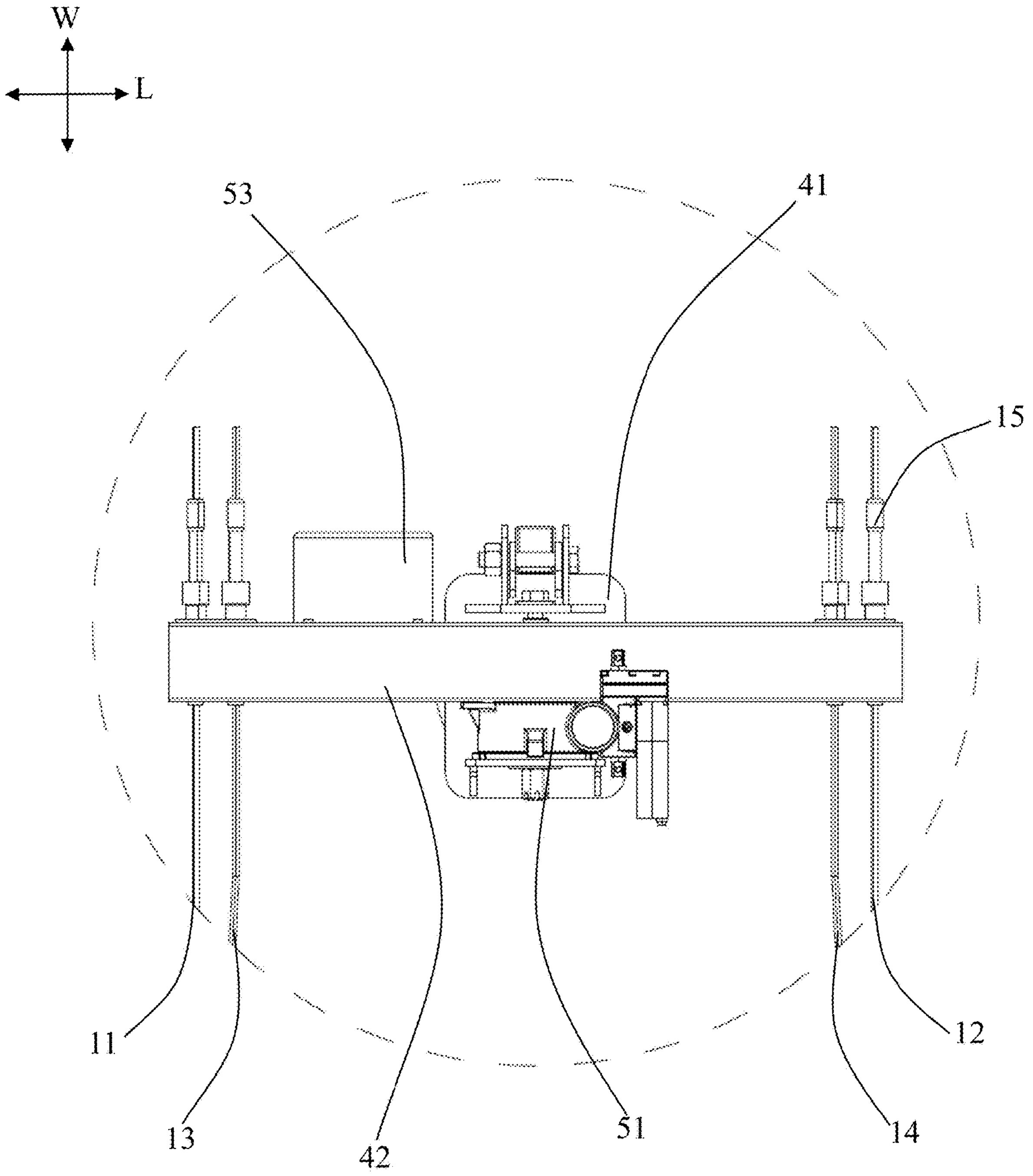
FIG. 9 is an enlarged structural view of area G in FIG. 7.
Figure 10:
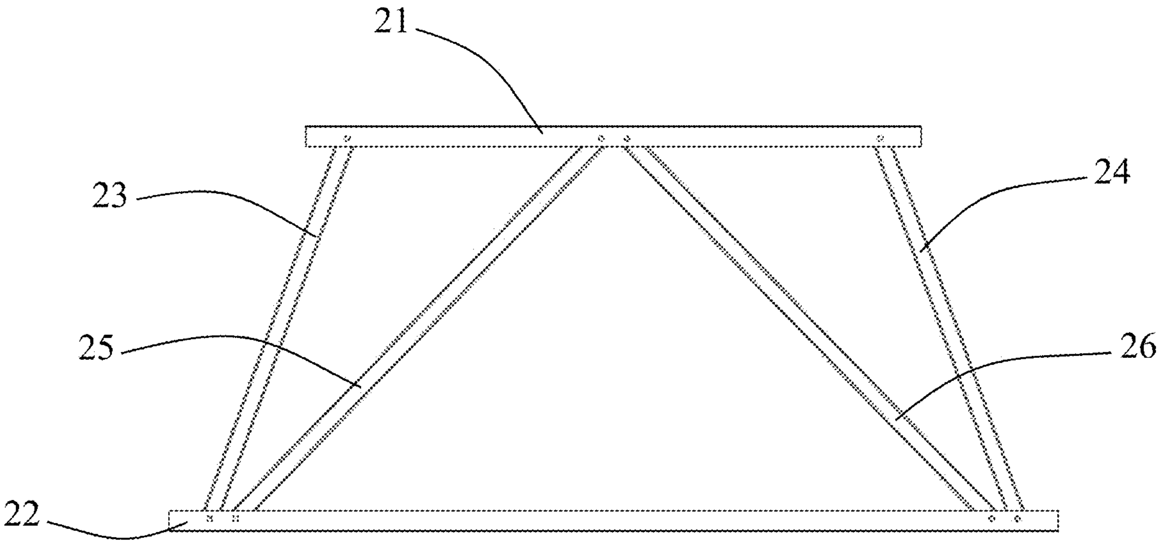
FIG. 10 is a schematic structural view of a support frame in accordance with a specific embodiment of the present disclosure.

Furthermore, referring to FIG. 3, FIG. 4 and FIG. 9, at a connection between the rope structure and the beam structure, the stabilizing ropes are located between the assembly ropes. Specifically, at the connection between the rope structure and the beam structure, the first stabilizing rope 13 and the second stabilizing rope 14 are located between the first assembly rope 11 and the second assembly rope 12. Moreover, the first stabilizing rope 13 and the first assembly rope 11 are located at a same height. The second stabilizing rope 14 and the second assembly rope 12 are located at a same height. Corresponding to the installation location of the photovoltaic modules 100 in the rope structure, the first assembly rope 11 and the second assembly rope 12 are located between the first stabilizing rope 13 and the second stabilizing rope 14. With this arrangement, the stabilizing rope at the connection with the beam structure can simultaneously generate an upward supporting force and an inward tightening force on the inclined upward stabilizing rope between adjacent beam structures. The stabilizing rope will not easily expand outward even though the central bend is located outside, thereby further improving the overall stability of the structure and the rotational smoothness of the rope structure.

Figure 11:
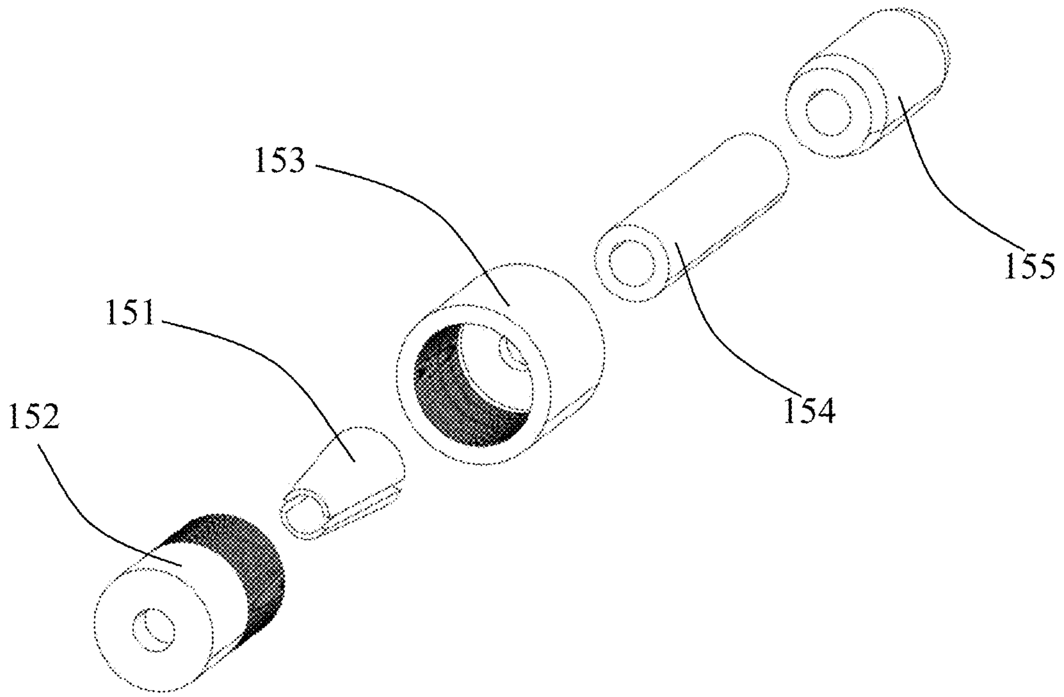
FIG. 11 is an exploded schematic view of an anchor in accordance with a specific embodiment of the present disclosure.
Figure 12:
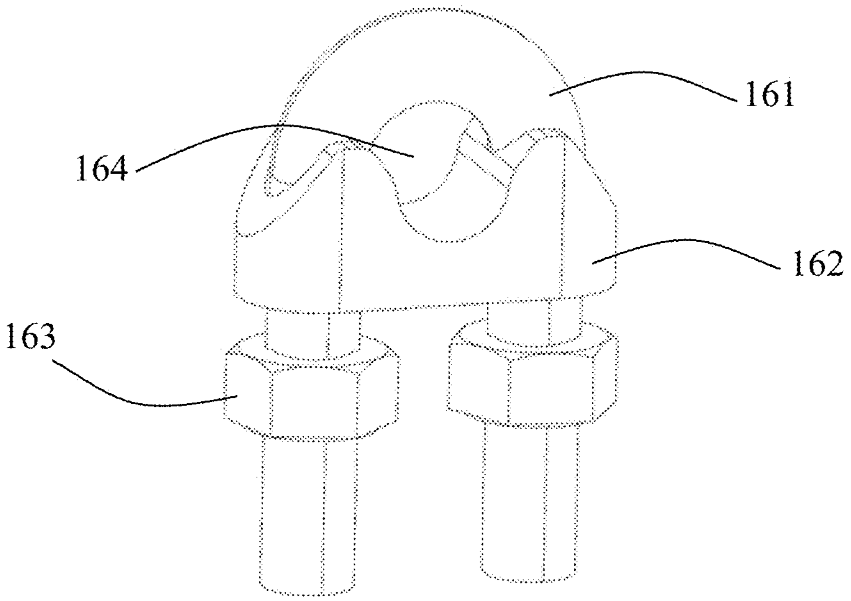
FIG. 12 is a schematic assembly view of a connecting component in accordance with a specific embodiment of the present disclosure.
Figure 13:
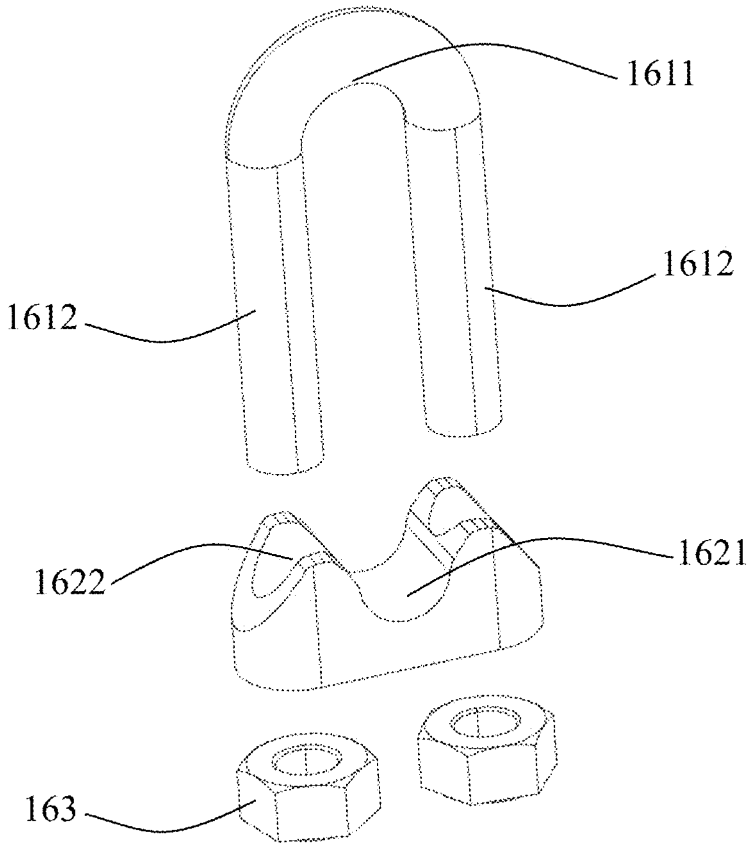
FIG. 13 is an exploded schematic view of the connecting component in accordance with a specific embodiment of the present disclosure.
Figure 14:
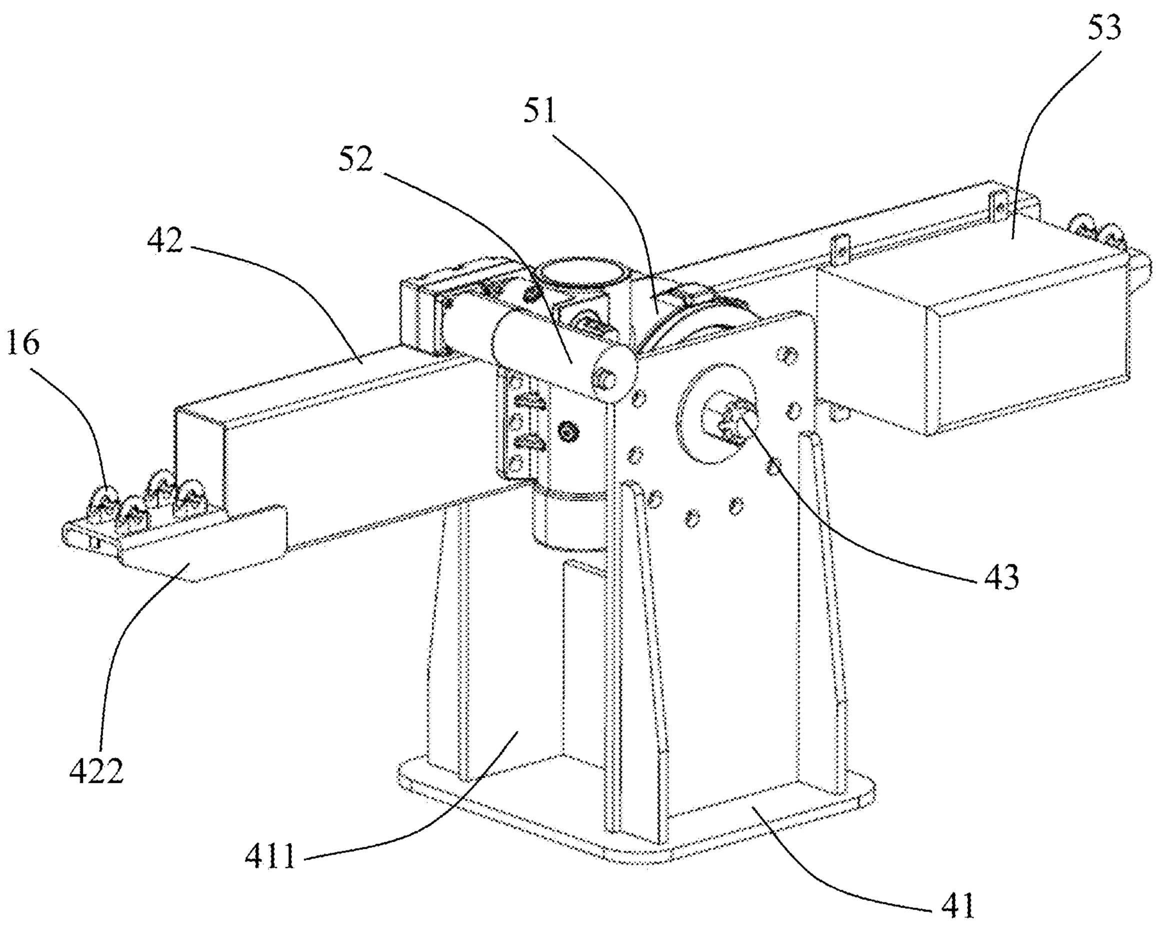
FIG. 14 is a schematic assembly view of a beam structure and a driving device in accordance with a specific embodiment of the present disclosure.
Figure 15:
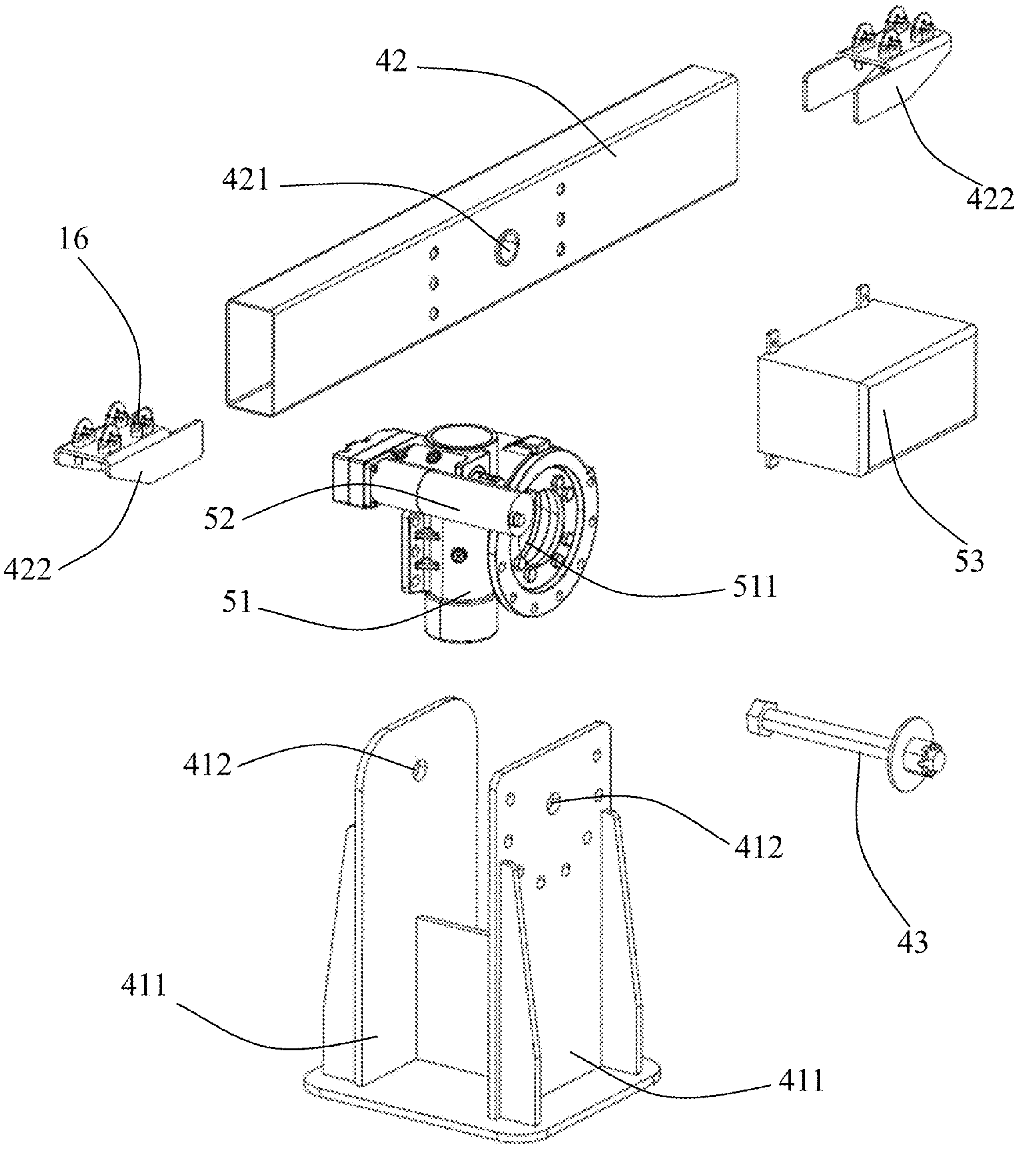
FIG. 15 is an exploded schematic view of the beam structure and the driving device in accordance with a specific embodiment of the present disclosure.

Referring to FIG. 3, FIG. 9 and FIG. 11, the rope structure further includes a plurality of anchors 15. The ends of the assembly ropes and the stabilizing ropes are fixed to the beam structures through the anchors 15. The anchor 15 includes a jacket 151, a fixing cylinder 152, a locking cylinder 153, a connecting tube 154 and an installation tube 155. The jacket 151 clamps the assembly rope or the stabilizing rope. The fixing cylinder 152 is sleeved on an outer periphery of the jacket 151 and contacts the beam structure. The locking cylinder 153 is fixedly connected to the fixing cylinder 152 and locks the jacket 151 so as to fix the assembly rope or the stabilizing rope. The connecting tube 154 is connected to an end of the locking cylinder 153 away from the fixing cylinder 152. The installation tube 155 is fixed to an end of the connecting tube 154 away from the locking cylinder 153. The assembly rope or the stabilizing rope is at least partially exposed on a side of the installation tube 155 away from the connecting tube 154. Furthermore, the jacket 151 is disposed separately to clamp the assembly rope or the stabilizing rope on opposite radial sides of the assembly rope or the stabilizing rope. An outer wall of the fixing cylinder 152 is provided with external threads, and an inner wall of the locking cylinder 153 is provided with corresponding internal threads so that the two can be fixedly connected and apply pressure to the jacket 151 located in the fixing cylinder 152 to lock the assembly rope or the stabilizing rope. The anchors 15 are used to fix the ends of the assembly ropes and the stabilizing ropes, so that when the assembly ropes and the stabilizing ropes are installed, an outward tensile force is applied and maintained at both ends. By tensioning the assembly ropes and the stabilizing ropes and having the assembly ropes and the stabilizing ropes having tension forces toward their respective ends, the stability of the rope structure and the supporting force for the photovoltaic modules 100 can be improved.

Referring to FIG. 1, FIG. 2, FIG. 5, FIG. 6, FIG. 7 and FIG. 10, the support frames 20 are installed on the rope structure and are spaced between adjacent beam structures for connecting the assembly ropes and stabilizing ropes, and supporting the photovoltaic modules 100. The support frame 20 includes a first cross rod 21, a second cross rod 22, a first side rod 23 and a second side rod 24. The first cross rod 21 is parallel to the second cross rod 22, and is located above the second cross rod 22. A length of the first cross rod 21 is smaller than a length of the second cross rod 22. The first side rod 23 and the second side rod 24 connect the ends on a same side of the first cross rod 21 and the second cross rod 22, respectively. Furthermore, the first cross rod 21 connects the first assembly rope 11 and the second assembly rope 12. The second cross rod 22 connects the first stabilizing rope 13 and the second stabilizing rope 14. The first side rod 23 connects an end of the first cross rod 21 adjacent to the first assembly rope 11 and an end of the second cross rod 22 adjacent to the first stabilizing rope 13. The second side rod 24 connects another end of the first cross rod 21 adjacent to the second assembly rope 12 and another end of the second cross rod 22 adjacent to the second stabilizing rope 14. Furthermore, the quadrilateral formed by the first cross rod 21, the second cross rod 22, the first side rod 23 and the second side rod 24 is a trapezoid. An angle between the first side rod 23 and the second cross rod 22, and an angle between the second side rod 24 and the second cross rod 22 are both less than 90°. In some embodiments, the angle between the first side rod 23 and the second cross rod 22, and the angle between the second side rod 24 and the second cross rod 22 are equal. That is, the trapezoid formed by the first cross rod 21, the second cross rod 22, the first side rod 23 and the second side rod 24 is an isosceles trapezoid and has a symmetrical structure. In other embodiments, the angle between the first side rod 23 and the second cross rod 22, and the angle between the second side rod 24 and the second cross rod 22 are not equal. With this arrangement, when the inclination angles of the assembly ropes on which the photovoltaic modules 100 are installed are too large, the first side rod 23 and the second side rod 24 can effectively support the assembly ropes and the photovoltaic modules 100. The photovoltaic modules 100 will not sag in an arc and cause distortion, thereby improving the structure stability of the bracket.

Furthermore, referring to FIG. 1, FIG. 2, FIG. 5, FIG. 6, FIG. 7 and FIG. 10, the support frame 20 further includes a first reinforcing rod 25 and a second reinforcing rod 26. The first reinforcing rod 25 and the second reinforcing rod 26 are disposed in the quadrilateral formed by the first cross rod 21, the second cross rod 22, the first side rod 23 and the second side rod 24 to enhance the structural strength and stability of the support frame 20. In this embodiment, the first reinforcing rod 25 connects the first cross rod 21 and the second cross rod 22. The second reinforcing rod 26 also connects the first cross rod 21 and the second cross rod 22. One end of the first reinforcing rod 25 connected to the second cross rod 22 is located adjacent to the first side rod 23. One end of the second reinforcing rod 26 connected to the second cross rod 22 is located adjacent to the second side rod 24. Another end of the first reinforcing rod 25 connected to the first cross rod 21 and another end of the second reinforcing rod 26 connected to the first cross rod 21 are located adjacent to each other, and located in the middle of the first cross rod 21. In some embodiments, the first reinforcing rod 25 and the second reinforcing rod 26 are arranged symmetrically, and the entire support frame 20 has a symmetrical structure. In other embodiments, the first reinforcing rod 25 and the second reinforcing rod 26 are arranged asymmetrically, and one or more reinforcing rods may be provided. The present application does not limit the number and arrangement of reinforcing rods, which can be set according to specific actual conditions.

In some embodiments, the support frame 20 is a cross-structured non-quadrilateral shape. In other embodiments, the support frame 20 is also configured as a three-dimensional structure. As long as the support frame 20 connects the assembly ropes and the stabilizing ropes on a cross section along the thickness direction of the photovoltaic modules 100, it can play the same role.

In this embodiment, each rod of the support frame 20 is made of U-shaped steel to facilitate the mutual connection between the rods, and holes are provided to facilitate the installation of fasteners for fixation.

Referring to FIG. 2, FIG. 6, FIG. 12 and FIG. 13, the support frame 20 is connected to the rope structure through a plurality of connecting components 16. The connecting component 16 includes a buckle 161, a holding block 162 and a plurality of nuts 163. The buckle 161 and the holding block 162 are fixedly connected through the nuts 163. Moreover, the buckle 161 cooperates with the holding block 162 to form a through hole 164 through which one of the assembly ropes and the stabilizing ropes passes. Specifically, the buckle 161 is a U-shaped buckle, including an upper arc portion 1611 and two fixing portions 1612 provided at two ends of the upper arc portion 1611. The holding block 162 includes a lower arc portion 1621 and two fourth through holes 1622 provided at two ends of the lower arc portion 1621. The upper arc portion 1611 and the lower arc portion 1621 cooperate to form the through hole 164 for one of the assembly ropes and the stabilizing ropes to pass through. The fixing portions 1612 pass through the fourth through holes 1622, and the nuts 163 are used on the other side of the holding block 162 to fix the outer periphery of the fixing portion 1612 and abut against the holding block 162, thereby achieving the fixation of the connecting components 16, and the connection between the support frame 20 and the rope structure. In this embodiment, the connecting components 16 are provided on the first cross rod 21 and the second cross rod 22. Moreover, the through hole 164 of the connecting component 16 on the first cross rod 21 is located on a side of the first cross rod 21 relatively away from the second cross rod 22. The through hole 164 of the connecting component 16 on the second cross rod 22 is located on a side of the second cross rod 22 away from the first cross rod 21. That is, in the thickness direction of the photovoltaic module 100, the support frame 20 is located between the assembly ropes and the stabilizing ropes.

Referring to FIG. 1, FIG. 5 and FIG. 7, the plurality of support frames 20 are arranged at intervals along the extension direction (the W direction) of the rope structure. The plurality of support frames 20 include a first support frame 201 located in the middle of the rope structure and a plurality of second support frames 202 disposed on two sides of the first support frame 201 along the extension direction (the W direction) of the rope structure. An area of the first support frame 201 is larger than an area of each of second support frames 202. The plurality of second support frames 202 include two first sub-support frames 203 and two second sub-support frames 204. The two first sub-support frames 203 are located on two sides of the first support frame 201, and are symmetrical with respect to the first support frame 201. The two second sub-support frames 204 are located on two sides of the first support frame 201 and are symmetrical with respect to the first support frame 201. The second sub-support frame 204 is disposed away from the first support frame 201 relative to the first sub-support frame 203. An area of the first sub-support frame 203 is larger than an area of the second sub-support frame 204. In this embodiment, the maximum lateral distance D between the first stabilizing rope 13 and the second stabilizing rope 14 is a distance between them at the first support frame 201.

Referring to FIG. 1, FIG. 3, FIG. 4, FIG. 5, FIG. 6, FIG. 9, FIG. 14 and FIG. 15, the basic structure of the flexible photovoltaic tracking bracket includes a plurality of upright columns 31 and a plurality of wind-resistant assemblies 32. The upright columns 31 are disposed on the ground at intervals. The wind-resistant assemblies 32 are spaced between adjacent upright columns 31. The beam structure is installed on the upright column 31. The beam structure includes a base 41 and an inclinable beam 42. The base 41 is fixed on the upright column 31. The driving device includes a rotary driving machine 51 and a motor 52. The motor 52 provides power to the rotary driving machine 51. The inclinable beam 42 and the rotary driving machine 51 are coaxially and rotatably installed on the base 41. Specifically, the base 41 includes two mounting plates 411 arranged in parallel. The inclinable beam 42 and the rotary driving machine 51 are installed between the two mounting plates 411, and the rotating driving machine 51 and the inclinable beam 42 are fixed. The mounting plate 411 defines a first mounting hole 412. The inclinable beam 42 defines a second mounting hole 421. The rotary driving machine 51 defines a third mounting hole 511. A rotating shaft 43 is used to pass through the first mounting hole 412, the second mounting hole 421 and the third mounting hole 511. The inclinable beam 42 and the rotary driving machine 51 are coaxially installed on the base 41, so that the rotary driving machine 51 can drive the inclinable beam 42 to rotate around a rotating axis 43 on the base 41. The driving device further includes a control box 53. The control box 53 is fixed to the inclinable beam 42 to control the rotary driving machine 51. The control box 53 and the inclinable beam 42 can be fixedly connected through a hoop. The wind-resistant assembly 32 includes a wind-resistant column 321, a wind-resistant rope 322 and a wind-resistant cross rod 323. The wind-resistant column 321 is fixed on the ground. The wind-resistant cross rod 323 is connected to the assembly rope through the connecting component 17. The wind-resistant rope 322 connects the wind-resistant column 321 and the wind-resistant cross rod 323. The wind-resistant assembly 32 is provided to effectively resist negative wind.

Compared with the traditional triangular support, the flexible photovoltaic tracking bracket of this embodiment has obvious advantages. A four-rope structure is adopted, and the assembly ropes for supporting the photovoltaic modules 100 and the stabilizing ropes located below the assembly ropes are provided. The stabilizing ropes include the first stabilizing rope 13 and the second stabilizing rope 14 which are disposed in the left-right direction (the L direction). The first stabilizing rope 13 has an arc shape that curves in the upper right direction, and/or the second stabilizing rope 14 has an arc shape that curves in the upper left direction. When the assembly ropes rotate under the drive of the driving device, the pre-stressed force of the bottommost stabilizing rope (such as the first stabilizing rope 13) can generate an upper-left or upper-right supporting force. The moment formed by the supporting force around the rotation center of the photovoltaic modules 100 can overcome the moment caused by the center of gravity of the entire system not being at the rotation center, thereby ensuring the stability of the entire row of photovoltaic modules 100, so that all photovoltaic modules 100 installed on the assembly ropes are on the same plane and are not easily twisted. As a result, it ensures the power generation and can also overcome the self-weight of the module to make the outer edges of all photovoltaic modules 100 flush and beautiful in appearance. Another stabilizing rope (such as the second stabilizing rope 14) can generate resistance to the force exerted on the front of the module by wind and support the photovoltaic modules 100 upward to overcome its gravity, thereby improving wind resistance. The present application can improve the smoothness of the rotation of the entire rope structure, reduce the stress on the inclinable beam 42, save materials for the inclinable beam 42, and reduce costs. Besides, the present application can also reduce the current of the motor and ensure the service life of the motor.

Referring to FIG. 1, FIG. 3, FIG. 4, FIG. 5, FIG. 14 and FIG. 15, this embodiment discloses the flexible photovoltaic tracking bracket with four-span assemblies in each row, including five upright columns 31. Two sets of wind-resistant assemblies 32 and five trapezoidal support frames 20 are provided for each span assembly support. The five trapezoidal support frames 20 include the first support frame 201 and two sets of second support frames 202 which are symmetrically disposed on two sides of the first support frame 201. Each set of second support frames 202 includes a first sub-support frame 203 and a second sub-support frame 204. A lower end of the wind-resistant column 321 is set in a shape of a spiral anchor to sink into the ground more firmly. The two ends of the assembly ropes and the stabilizing ropes are respectively fixed on the beam structure located on two end upright columns 31, tensile forces are applied to them, and are fixed to the inclinable beam 42 using the anchors 15. As for the inclinable beam 42 across the central upright column 31, the assembly ropes and the stabilizing ropes are limited through the connecting component 16. In order to keep the assembly ropes and the stabilizing ropes at the same height on each inclinable beam 42, two extension components 422 are further provided across the inclinable beam 42 on the central upright column 31. The two extension components 422 are fixed on two ends of the inclinable beam 42. The assembly ropes and the stabilizing ropes are fixed to the extension components 422 through the connecting components 16.

In summary, compared with the existing technology, the flexible photovoltaic tracking bracket of the present disclosure has the following advantages: firstly, it reduces the eccentric torque generated by the modules when they rotate at a certain angle, making the modules less likely to be twisted and ensuring that the entire row of modules is located on the same plane. Besides, it also reduces the current of the rotary motor, avoids overcurrent during operation, and extends the service life of the motor. Secondly, it improves the stability and aesthetics. Compared with the traditional triangular support, it not only improves the stability of the structure, but also allows the edges of the entire row of modules to be in a straight line, thereby improving the appearance of the modules. Thirdly, the entire system can ensure excellent mechanical properties and stability under reasonable manufacturing costs. In summary, the flexible photovoltaic tracking bracket of the present disclosure improves the stability and reliability of the photovoltaic bracket by solving the problems existing in the traditional flexible bracket, and has high practical value.

The above embodiments are only used to illustrate the present disclosure and do not limit the technical solutions described in the present disclosure. The understanding of this description should be based on those skilled in the art. Although the present disclosure has been described in detail with reference to the above-mentioned embodiments, it is understandable to those skilled in the art that those skilled in the art can still make modifications or equivalent substitutions to the present disclosure. All technical solutions and improvements that do not depart from the spirit and scope of the present disclosure shall be covered by the claims of the present disclosure.

What is claimed is:

1. A flexible photovoltaic tracking bracket, comprising:

a plurality of basic structures fixed to a ground at intervals;

a plurality of beam structures correspondingly installed to the basic structures;

a driving device installed to the beam structure and configured to drive the beam structure to rotate around an axis;

a rope structure connecting adjacent beam structures; the rope structure comprising assembly ropes and stabilizing ropes; the stabilizing ropes being located below the assembly ropes; the assembly ropes being configured to be fixedly connected to a plurality of photovoltaic modules; the assembly ropes comprising a first assembly rope and a second assembly rope; the first assembly rope is disposed on a left side of the second assembly rope as viewed from above along a direction perpendicular to a plane where the first assembly rope and the second assembly rope are located; the second assembly rope is disposed on a right side of the first assembly rope as viewed from above along the direction perpendicular to the plane where the first assembly rope and the second assembly rope are located; the first assembly rope and the second assembly rope are spaced apart along a left-right direction; the stabilizing ropes comprising a first stabilizing rope and a second stabilizing rope which are disposed along the left-right direction; and a support frame connected to the assembly ropes and the stabilizing ropes;

wherein the first stabilizing rope is in an arc shape that curves in an upper right direction, and/or, the second stabilizing rope is in an arc shape that curves in an upper left direction;

wherein as viewed from above along the direction perpendicular to the plane where the first assembly rope and the second assembly rope are located, the assembly ropes are located between the first stabilizing rope and the second stabilizing rope.

2. The flexible photovoltaic tracking bracket according to claim 1, wherein as viewed along a cross section of the rope structure, the first stabilizing rope and the second stabilizing rope are symmetrical with respect to a mid-perpendicular line which is perpendicular to a connecting line connecting the first assembly rope and the second assembly rope.

3. The flexible photovoltaic tracking bracket according to claim 1, wherein the support frame comprises a first cross rod, a second cross rod, a first side rod and a second side rod; the first cross rod connects the first assembly rope and the second assembly rope; the second cross rod connects the first stabilizing rope and the second stabilizing rope; the first side rod connects one end of the first cross rod adjacent to the first assembly rope and one end of the second cross rod adjacent to the first stabilizing rope; the second side rod connects another end of the first cross rod adjacent to the second assembly rope and another end of the second cross rod adjacent to the second stabilizing rope.

4. The flexible photovoltaic tracking bracket according to claim 3, wherein a plurality of the support frames are provided and disposed at intervals along an extension direction of the rope structure; the plurality of support frames comprise a first support frame located in a middle of the rope structure and a plurality of second support frames disposed on two sides of the first support frame along the extension direction of the rope structure; an area of the first support frame is larger than an area of the second support frame.

5. The flexible photovoltaic tracking bracket according to claim 1, wherein at a connection of the rope structure and the beam structure, the stabilizing ropes are located between the first assembly rope and the second assembly rope.

6. The flexible photovoltaic tracking bracket according to claim 1, wherein the rope structure further comprises a plurality of anchors; ends of the assembly ropes and ends of the stabilizing ropes are fixed to the beam structure through the anchors; each of the assembly ropes and the stabilizing ropes has a tension force towards a respective end thereof.

7. The flexible photovoltaic tracking bracket according to claim 1, wherein the support frame is connected to the rope structure through a plurality of connecting components; the connecting component comprises a buckle, a holding block and a nut; the buckle and the holding block are fixedly connected through the nut; the buckle and the holding block form a through hole through which one of the assembly ropes and the stabilizing ropes is configured to pass.

8. The flexible photovoltaic tracking bracket according to claim 1, wherein the basic structures comprise a plurality of upright columns and a plurality of wind-resistant assemblies; the wind-resistant assemblies are disposed at intervals between adjacent upright columns; the beam structures are installed to the upright columns.

9. The flexible photovoltaic tracking bracket according to claim 8, wherein the beam structure comprises a base and an inclinable beam; the base is fixed to the upright column; the driving device comprises a rotary driving machine and a motor; the motor provides power to the rotary driving machine; the inclinable beam and the rotary driving machine are coaxially and rotatably installed to the base.

10. A flexible photovoltaic tracking bracket, comprising:

a plurality of basic structures configured to be fixed to a ground and being disposed at intervals;

a plurality of beam structures correspondingly installed to the basic structures;

a driving device configured to drive each beam structure to rotate around an axis;

a rope structure connecting adjacent beam structures; the rope structure comprising assembly ropes and stabilizing ropes; the stabilizing ropes being located below the assembly ropes; the assembly ropes being configured to be fixedly connected to a photovoltaic module; the assembly ropes comprising a first assembly rope and a second assembly rope; the first assembly rope is disposed on a left side of the second assembly rope as viewed from above along a direction perpendicular to a plane where the first assembly rope and the second assembly rope are located; the second assembly rope is disposed on a right side of the first assembly rope as viewed from above along the direction perpendicular to the plane where the first assembly rope and the second assembly rope are located; the first assembly rope and the second assembly rope are spaced apart along a left-right direction; the stabilizing ropes comprising a first stabilizing rope and a second stabilizing rope which are disposed along the left-right direction; and a support frame being of a quadrilateral configuration, the support frame comprising a first cross rod, a second cross rod disposed opposite to the first cross rod, a first side rod and a second side rod disposed opposite to the first side rod; the first cross rod connecting the first assembly rope and the second assembly rope; the second cross rod connecting the first stabilizing rope and the second stabilizing rope; the first assembly rope being connected to one end the first cross rod, and the second assembly rope being connected to another end of the first cross rod; the first stabilizing rope being connected to one end of the second cross rod, and the second stabilizing rope being connected to another end of the second cross rod;

wherein the first stabilizing rope is in an arc shape that curves in an upper right direction, and/or, the second stabilizing rope is in an arc shape that curves in an upper left direction;

wherein as viewed from above along the direction perpendicular to the plane where the first assembly rope and the second assembly rope are located, the assembly ropes are located between the first stabilizing rope and the second stabilizing rope.

11. The flexible photovoltaic tracking bracket according to claim 10, wherein as viewed along a cross section of the rope structure, the first stabilizing rope and the second stabilizing rope are symmetrical with respect to a mid-perpendicular line which is perpendicular to a connecting line connecting the first assembly rope and the second assembly rope.

12. The flexible photovoltaic tracking bracket according to claim 10, wherein the first side rod connects the one end of the first cross rod adjacent to the first assembly rope and the one end of the second cross rod adjacent to the first stabilizing rope; the second side rod connects the another end of the first cross rod adjacent to the second assembly rope and the another end of the second cross rod adjacent to the second stabilizing rope; and wherein the support frame further comprises a reinforcing rod connecting the first cross rod and the second cross rod on one side, and a second reinforcing rod connecting the first cross rod and the second cross rod on another side.

13. The flexible photovoltaic tracking bracket according to claim 12, wherein a plurality of the support frames are provided and disposed at intervals along an extension direction of the rope structure; the plurality of support frames comprise a first support frame located in a middle of the rope structure and a plurality of second support frames disposed on two sides of the first support frame along the extension direction of the rope structure; an area of the first support frame is larger than an area of the second support frame.

14. The flexible photovoltaic tracking bracket according to claim 10, wherein at a connection of the rope structure and the beam structure, the stabilizing ropes are located between the first assembly rope and the second assembly rope.

15. The flexible photovoltaic tracking bracket according to claim 10, wherein the rope structure further comprises a plurality of anchors; ends of the assembly ropes and ends of the stabilizing ropes are fixed to the beam structure through the anchors; each of the assembly ropes and the stabilizing ropes has a tension force towards a respective end thereof.

16. The flexible photovoltaic tracking bracket according to claim 10, wherein the support frame is connected to the rope structure through a plurality of connecting components; the connecting component comprises a buckle, a holding block and a nut; the buckle and the holding block are fixedly connected through the nut; the buckle and the holding block form a through hole through which one of the assembly ropes and the stabilizing ropes is configured to pass.

17. The flexible photovoltaic tracking bracket according to claim 10, wherein the basic structures comprise a plurality of upright columns and a plurality of wind-resistant assemblies; the wind-resistant assemblies are disposed at intervals between adjacent upright columns; the beam structures are installed to the upright columns.

18. The flexible photovoltaic tracking bracket according to claim 17, wherein the beam structure comprises a base and an inclinable beam; the base is fixed to the upright column; the driving device comprises a rotary driving machine and a motor; the motor provides power to the rotary driving machine; the inclinable beam and the rotary driving machine are coaxially and rotatably installed to the base.

* * * * *